(12) United States Patent
Uhrenholt et al.

(10) Patent No.: US 11,205,243 B2
(45) Date of Patent: Dec. 21, 2021

(54) DATA PROCESSING SYSTEMS

(71) Applicant: Arm Limited, Cambridge (GB)

(72) Inventors: Olof Henrik Uhrenholt, Lomma (SE);
Andreas Due Engh-Halstvedt,
Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/742,556

(22) Filed: Jan. 14, 2020

(65) Prior Publication Data

US 2021/0217131 A1 Jul. 15, 2021

(51) Int. Cl.
*G06T 9/00* (2006.01)
*G06T 1/60* (2006.01)
*G06F 12/0875* (2016.01)
*G06T 1/20* (2006.01)

(52) U.S. Cl.
CPC ............ *G06T 1/60* (2013.01); *G06F 12/0875* (2013.01); *G06T 1/20* (2013.01); *G06F 2212/401* (2013.01); *G06F 2212/455* (2013.01)

(58) Field of Classification Search
CPC . G06T 1/60; G06T 9/00; G09G 5/393; G09G 5/395; G09G 2320/103; G09G 2360/122; G09G 2360/121; G09G 2360/12; G06F 2212/401; G06F 12/0804
See application file for complete search history.

(56) References Cited

U.S. PATENT DOCUMENTS

| | | | |
|---|---|---|---|
| 5,943,421 A | 8/1999 | Grabon | |
| 6,181,350 B1 | 1/2001 | Corona | |
| 6,449,692 B1 | 9/2002 | Krueger et al. | |
| 6,483,516 B1 | 11/2002 | Tischler | |
| 6,518,974 B2 | 2/2003 | Taylor | |
| 7,171,051 B1 | 1/2007 | Moreton | |
| 8,271,734 B1 | 9/2012 | Glasco | |
| 8,411,753 B2 | 4/2013 | Cha | |
| 8,447,948 B1 | 5/2013 | Erdogan | |
| 8,542,939 B2 | 9/2013 | Nystad | |
| 8,988,443 B2 | 3/2015 | Croxford | |
| 8,990,518 B2 | 3/2015 | Nystad | |
| 9,014,496 B2 | 4/2015 | Nystad | |
| 9,116,790 B2 | 8/2015 | Nystad | |
| 9,239,784 B1 | 1/2016 | Haghighi | |
| 9,406,155 B2 | 8/2016 | Oterhals | |
| 9,881,401 B2 | 1/2018 | Oterhals | |
| 10,388,057 B2 | 8/2019 | Fielding | |
| 2003/0151610 A1 | 8/2003 | Kuriakin | |
| 2007/0252843 A1 | 11/2007 | Yu | |

(Continued)

OTHER PUBLICATIONS

Office Action dated Nov. 11, 2019, U.S. Appl. No. 15/714,037.

(Continued)

*Primary Examiner* — Hau H Nguyen
(74) *Attorney, Agent, or Firm* — Vierra Magen Marcus LLP

(57) ABSTRACT

A data processing system includes a memory and a processor in communication with the memory. The processor is configured to, when storing an array of data in the memory, produce information representative of the content of a block of data representing a particular region of the array of data, write the block of data to a data structure in the memory, and write the information representative of the content of the block of data to the data structure.

19 Claims, 5 Drawing Sheets

(56) References Cited

U.S. PATENT DOCUMENTS

| | | | |
|---|---|---|---|
| 2009/0160857 A1 | 6/2009 | Rasmusson | |
| 2010/0161904 A1 | 6/2010 | Cypher | |
| 2010/0281212 A1 | 11/2010 | Selvan | |
| 2014/0122809 A1 | 5/2014 | Robertson | |
| 2014/0140401 A1 | 5/2014 | Lee | |
| 2014/0156948 A1 | 6/2014 | Roberts | |
| 2014/0330796 A1 | 11/2014 | Dally | |
| 2015/0169459 A1 | 6/2015 | Huang | |
| 2015/0178214 A1 | 6/2015 | Alameldeen | |
| 2016/0048980 A1 | 2/2016 | Wang | |
| 2017/0024158 A1* | 1/2017 | Brkic | G09G 5/393 |
| 2017/0255562 A1 | 9/2017 | Usui | |
| 2017/0256024 A1 | 9/2017 | Abraham | |
| 2017/0262373 A1 | 9/2017 | Bedi | |
| 2017/0285955 A1* | 10/2017 | Carter | G06T 11/40 |
| 2017/0286302 A1 | 10/2017 | Roy | |
| 2017/0287101 A1* | 10/2017 | Flordal | G06F 3/0604 |
| 2017/0293561 A1 | 10/2017 | Dwiel | |
| 2017/0295379 A1 | 10/2017 | Sun | |
| 2018/0089091 A1 | 3/2018 | Akenine-Moller | |
| 2018/0286010 A1 | 10/2018 | Koker et al. | |
| 2019/0096027 A1 | 3/2019 | Fielding | |
| 2020/0160484 A1 | 5/2020 | Appu et al. | |

OTHER PUBLICATIONS

Response to Office Action dated Jul. 10, 2019, U.S. Appl. No. 15/714,037.
Final Office Action dated Aug. 6, 2019, U.S. Appl. No. 15/714,037.
Office Action dated Dec. 12, 2018, U.S. Appl. No. 16/029,619.
Response to Office Action dated Mar. 12, 2019, U.S. Appl. No. 16/029,619.
Notice of Allowance dated Apr. 5, 2019, U.S. Appl. No. 16/029,619.
UK Patent Application No. 1711269.9, filed Jul. 13, 2017, "Graphics Processing Systems," Applicant Arm Limited.
UK Filing Receipt dated Jul. 13, 2017, UK Patent Application No. 1711269 9, filed Jul. 13, 2017, "Graphics Processing Systems," Applicant Arm Limited.
Zhang et al., Enabling Partial Cache Line Prefetching Through Data Compression, URL: www.cs.ucr.edu/~gupta/research/Publications/Comp/icpp03.pdf (Year: 2003).
Uhrenholt, et al., U.S. Appl. No. 16/742,495, titled "Cache Arrangement for Data Processing Systems," filed Jan. 14, 2020.
Uhrenholt, et al., U.S. Appl. No. 16/742,519, titled "Cache Operations in Data Processing Systems," filed Jan. 14, 2020.
Non-Final Office Action dated May 17, 2021, U.S. Appl. No. 16/742,519.
Cheriton et al., "Software-Controlled Caches in the VMP Multiprocessor", May 1986, ACM, ACM SIGARCH Computer News, pp. 366-374, (1986).
Jacob et al., "Software-Managed Address Translation", Feb. 1997, IEEE, HPCA '97, pp. 156-167 (1997).
Abali et al., "Performance of Hardware Compressed Main Memory", Jan. 2001, IEEE, HPCA '01, pp. 73-81 (2001).
Espasa et al., "Tarantula: A Vector Extension to the Alpha Architecture", May 2002, IEEE, ISCA '02, pp. 281-292 (2002).
Zheng et al., "Performance Evaluation of Exclusive Cache Hierarchies", Mar. 2004, IEEE, ISPASS '04, pp. 89-96 (2004).
Shahar et al., "ActivePointers: A Case for Software Address Translation on GPUs", Jun. 2016, ACM/IEEE '16, pp. 596-608 (2016).
Non-Final Office Action dated Jun. 11, 2021, U.S. Appl. No. 16/742,495.
Response to Non-Final Office Action dated Aug. 17, 2021, U.S. Appl. No. 16/742,519.
Final Office Action dated Aug. 25, 2021, U.S. Appl. No. 16/742,519.
Response to Non-Final Office Action dated Oct. 11, 2021, U.S. Appl. No. 16/742,495.

* cited by examiner

DATA PROCESSING SYSTEMS

BACKGROUND

The technology described herein relates to data processing systems and in particular to systems for and methods of writing out arrays of data generated by data processing systems, such as graphics processing systems.

When processing (e.g. video) image data, the output (e.g. frame) of a, e.g., graphics processing system is usually written to an output (e.g. frame or window) buffer in memory when it is ready for display. The writing of the data to the output buffer consumes a relatively significant amount of power and memory bandwidth, particularly where, as is typically the case, the output buffer resides in memory that is external to the, e.g., graphics processor.

It is therefore desirable to try to reduce the power consumption of output buffer operations. One technique proposed to achieve this is disclosed in the Applicants' earlier application GB-2474114. According to this technique, each output frame is written to the output buffer by writing blocks of data representing particular regions of the frame. When a block of data is to be written to the output buffer, the block of data is compared to a block of data already stored in the output buffer, and a determination is made as to whether or not to write the block of data to the output buffer on the basis of the comparison.

The Applicants believe that there remains scope for improvements to such operations when writing out data arrays to memory.

BRIEF DESCRIPTION OF THE DRAWINGS

A number of embodiments of the technology described herein will now be described by way of example only and with reference to the accompanying drawings, in which.

DETAILED DESCRIPTION

Figure 1:
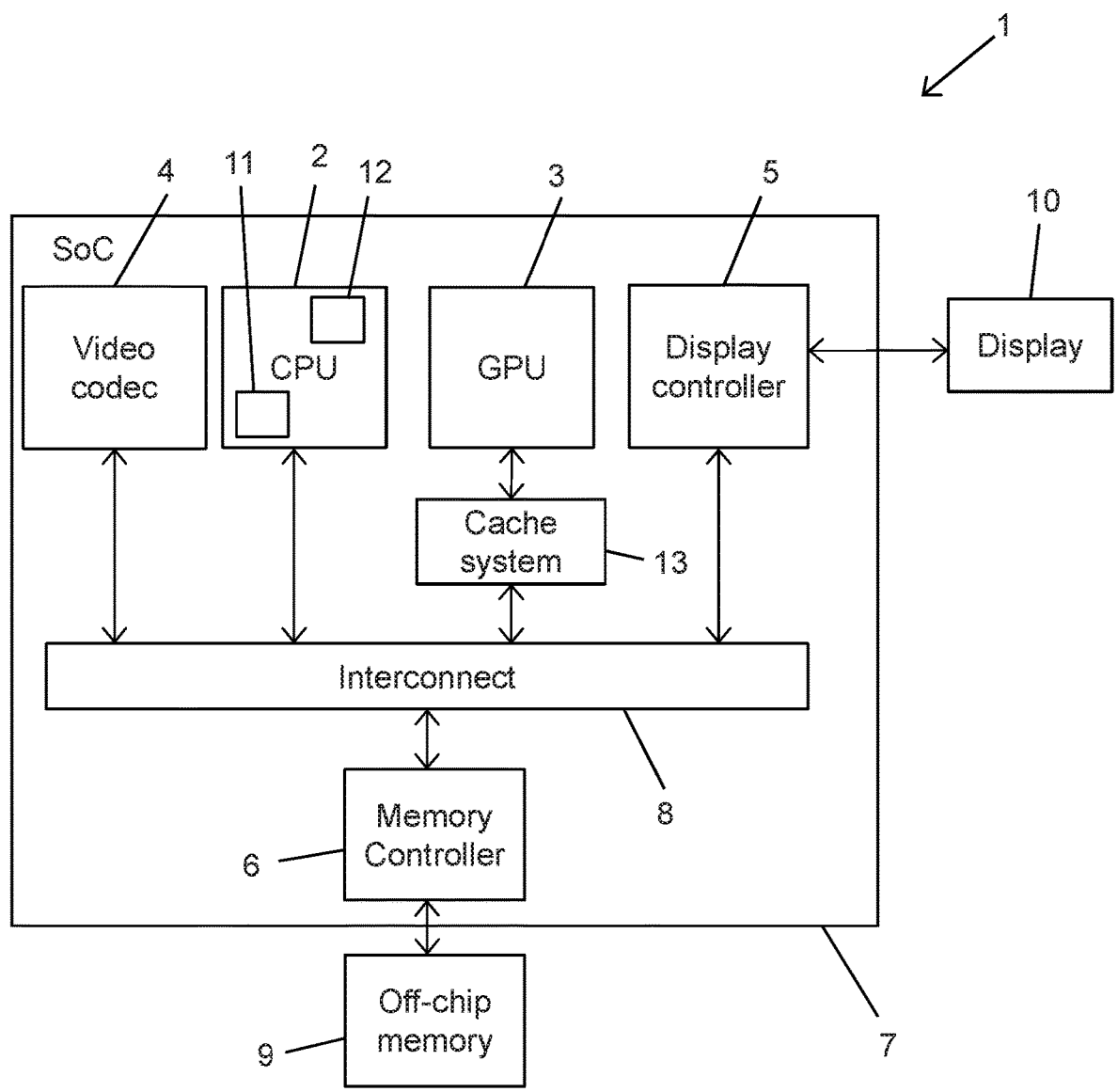
FIG. 1 shows an exemplary graphics processing system in which the technology described herein may be implemented.

One embodiment of the technology described herein comprises a method of operating a data processing system comprising:
when an array of data is to be stored in a memory:
produce information representative of the content of a block of data representing a particular region of the array of data;
writing the block of data to a data structure in the memory; and
writing the information representative of the content of the block of data to the data structure.

Another embodiment of the technology described herein comprises a data processing system comprising:
a memory; and
a processor in communication with the memory;
wherein the processor is configured to:
when storing an array of data in the memory:
produce information representative of the content of a block of data representing a particular region of the array of data;
write the block of data to a data structure in the memory; and
write the information representative of the content of the block of data to the data structure.

Thus the technology described herein comprises a method of operating a data processing system and a data processing system per se. The data processing system includes a processor, e.g. arranged to generate data that is used to form arrays of data (e.g. frames of image data, e.g. for display). The data processing system also includes a memory for storing the arrays of data. The processor is in (data) communication with the memory.

The method includes (and the processor is configured to) producing information that is representative of the content of block(s) of data that represent particular respective region(s) of a data array, when the array of data is to be stored in the memory. For a block of data to be stored, the block of data is written to a data structure in the memory, along with the content-representative information for that block. Thus the block of data itself and the content-representative information for that block are stored together in the same data structure (in memory).

As will be discussed further below, the Applicants have recognised that storing the content-representative information in the same (single) data structure as the block of data whose content it represents (that was used to produce the content-representative information) can make it easier to work with this data as whole (i.e. the block of data and the associated content-representative information). This contrasts, for example, to using a separate data structure (e.g. buffer) that stores the content-representative information.

For example, the data structure of the technology described herein may help drivers that are to be used with the data processing system because they then only need to refer to a single (e.g. header of a) data structure when using the data array and content representative-information. This may particularly be the case with newer (graphics) APIs such as Vulkan.

The information representative of the content of the block may be used, for example, to perform a comparison of the data in the block with a version of the block that is already stored in memory, and/or with the data in other blocks (e.g. in other (e.g. previous or subsequent) arrays of data). This comparison may allow a decision to be made as to whether to actually write the block of data to memory or not, thereby allowing the number of blocks of data that are written to memory to be reduced, and so helping to reduce the power and memory bandwidth consumption related to data array output (e.g. frame buffer) operations.

The technology described herein may be implemented in any suitable and desired data processing system. For example, the processor may comprise a graphics processor (GPU) (graphics processing unit), display processor (DPU) (display processing unit), a video processor (VPU) (video processing unit) or an image signal processor (ISP). The Applicants have recognised that storing content-representative information in the same (single) data structure as the block of data whose content it represents (that was used to produce the content-representative information) in the manner discussed may be particularly useful in the context of graphics processors. Therefore, in one embodiment the data processing system comprises a graphics processing system and the processor comprises a graphics processor (GPU) (graphics processing unit).

The array of data that is to be stored in memory and the block of data that is to be written to the data structure in the memory (and from which the content-representative information is generated) may be any suitable and desired array of data and block of that array that a data processor may operate on. In one embodiment, the array of data and the block of data comprises an array of data and a block of data that the data processor is processing, the array of data and the block of data (each) comprising an array of data elements each having an associated data value(s).

The array of data may comprise, for example, an image that the data (e.g. graphics) processor is processing, and thus the array of data will comprise appropriate colour values for the data elements (sampling positions) of the data array and that the data array represents. In this case, the array of data may comprise, for example, a frame that the processor is processing, e.g. for display, and/or data, such as a graphics texture, that is being used or generated by the processor. In other arrangements, the array of data may comprise geometry data, such as for or of vertices and/or primitives that the processor is processing.

Thus, in an embodiment, the array of data that is to be stored in the memory and the block of data handled in the manner of the technology described herein comprises image data (e.g. a texture or frame) or geometry data (positions and/or attributes). Thus, in one embodiment, the block of data that is written out, and for which the content-representative information is generated, comprises a block (e.g. tile) of image or geometry data that represents a particular region of the frame of image data.

The data (e.g. graphics) processing operation that the (e.g. graphics) processor is performing using the array of data can correspondingly be any suitable and desired (e.g. graphics) processing operation that a (e.g. graphics) processor can perform. Thus it may, for example, be an appropriate graphics geometry processing operation, or a fragment (pixel) shading operation, etc. In an embodiment, the processing operation is a graphics shading operation, such as a geometry shading, vertex shading, or fragment shading operation. The operation could also be a compute shading operation, where the (e.g. graphics) processor is performing compute shading operations.

The block of data (that is written to the data structure and which is used to generate the content-representative information) may represent any suitable and desired region of the array of data. For example, the block of data may represent the whole of the array of data (e.g. only a single block of data may be written out for the whole of the array of data).

However, in one embodiment the block of data represents a portion (less than the whole) of the array of data. In an embodiment the array of data comprises a plurality of blocks of data. In an embodiment the plurality of blocks of data represent a respective plurality of regions (areas) of the array of data.

Thus, in an embodiment, the method is performed (and the processor is configured to, inter alia, produce the content-representative information and write out the block of data and the content-representative information to a data structure) for (e.g. each of) a plurality of blocks (making up some or all of the overall data array). As discussed below, there are a number of different ways in which this may be implemented.

Also, as discussed below, there may be embodiments in which (e.g. owing to the content of the block and thus the nature of the content-representative information produced) a block of data (and, e.g. the content-representative information for the block) may not be written out. Thus, when the array of data is represented by a plurality of blocks of data, some or all of the blocks of data (and, e.g. the content-representative information for these blocks) may not be written out (e.g. because existing blocks already stored in the memory may be used instead).

In an embodiment the array of data comprises an array of data of a stream of arrays of data (e.g. a stream of frames of image data) that are to be processed in the manner of the technology described herein. Thus, in an embodiment, the method is performed (and the processor is configured to, inter alia, produce the content-representative information and write out the block(s) of data and the content-representative information to a data structure) for (e.g. each of) a plurality of arrays of data of a stream of arrays of data.

When the array of data is to be represented by a plurality of blocks of data, in an embodiment the method comprises (and the processor is configured to) dividing the array of data into a plurality of blocks of data. Each of the plurality of blocks of data may then be processed using the method of the technology described herein.

The blocks of data that the array of data is divided into for the purposes of producing the content-representative information (and for writing out the blocks and the associated content-representative information) may each represent any suitable and desired region (area, e.g. tile) of the array of data (e.g. a frame of image data) that the processor is able to operate on. In an embodiment, each block of data represents a different region of the overall array of data (although the blocks could overlap if desired). Each block should represent an appropriate region (area) of the array of data, such as a plurality of data positions within the array (e.g. pixels of image data).

In an embodiment the block(s) of data of the array of data are rectangular in shape, e.g. square. The rectangular blocks may take any suitable and desired size. In an embodiment the rectangular blocks each have a size between and including 4×4 data elements (sampling positions, e.g. pixels) and 64×64 data elements, e.g. with each edge of the rectangular blocks having a size of $2^n$ data elements, where n is an integer (e.g. between and including 2 and 6). For example, a block may correspond to a (e.g. 16×16 sampling position) rendering tile, e.g. of a frame of image data.

The block of data (representing a particular region of the array of data), for which the content-representative information has been produced, may be written to the data structure in the memory in any suitable and desired way. For example, the block of data may be written to (and stored in) the data structure in an unencoded (e.g. uncompressed) format. However, in one embodiment the block of data is written to (and stored in) the data structure in an encoded (e.g. compressed) format, e.g. using a block-based encoding (compression) scheme.

Thus, in an embodiment, the method comprises (and the processor is configured to) encoding (and, e.g., compressing) the block of data of the array of data and writing the encoded block of data to the data structure in memory. As is outlined below, the content-representative information may also be encoded (compressed) (e.g. as part of the associated block of data) for writing out.

The one or more blocks of the array of data may be encoded (compressed) using any suitable and desired encoding (compression) technique. In one set of embodiments the method comprises (and the processor is configured to) encoding the one or more blocks of the array of data using the frame buffer compression techniques described in the Applicant's U.S. Pat. No. 8,542,939 B2, U.S. Pat. No. 9,014,496 B2, U.S. Pat. No. 8,990,518 B2 and U.S. Pat. No. 9,116,790 B2. In one set of embodiments the method comprises (and the processor is configured to) also or instead encoding the one or more blocks of the array of data using a fixed rate compression technique.

The encoding of the block of data may be performed by any suitable and desired element (e.g. processing unit) of or associated with the processor. For example, the encoding may be performed by a shader core of the (e.g. graphics) processor or by an (e.g. external) encoder associated with the processor or memory.

In one embodiment the data processing system comprises a cache system (e.g. of the processor and) configured to transfer data block(s) stored in the memory to the processor for use by the processor when performing (e.g. graphics) processing operations and to transfer data block(s) from the processor to the memory;

the cache system comprising:
a cache configured to receive data block(s) from the memory and to provide data block(s) to the processor for use when performing (e.g. graphics) processing operations and to receive data block(s) from the processor for sending to the memory; and
a data encoder associated with the cache and configured to:
when a data block in an uncompressed format is to be written from the cache to the memory, encode the uncompressed data block from the cache for storing in the memory in a compressed format and send the data block in the compressed format to the memory for storing; and
when a data block in a compressed format is to be read from the memory into the cache, decode the compressed data block from the memory and store the data block in the cache in an uncompressed format.

In an embodiment, the data encoder is between the (e.g. L2) cache of the processor and the (external) memory. In an embodiment the data encoder is integrated into the (e.g. L2) cache system of the processor.

The data structure in memory to which the block of data is written may be arranged in any suitable and desired way in the memory. In one embodiment the memory comprises an output buffer, and the block of data and the associated content-representative information is written to a data structure in the output buffer. The output buffer may, for example, comprise a frame buffer to which a frame of image data is output.

In an embodiment plural blocks of data (e.g. making up the whole) of the array of data are written to the memory. Thus, in one set of embodiments the method comprises (and the processor is configured to), for each of a plurality of blocks of data in the array of data, each block of data representing a particular region of the array of data: producing information representative of the content of the block of data, writing the block of data to a data structure in the memory, and writing the information representative of the content of the block of data to the data structure (e.g. such that the data structure stores the plurality of blocks of data and the associated (plural pieces of) associated content-representative information).

When a plurality of blocks of data are written out, for each block of data (of the plurality of blocks) that is written out, the block of data and its content-representative information are written to the same data structure in the memory. However, as will be outlined below, different blocks of data (e.g. of the same array of data) and their respective pieces of content-representative information may be written to different data structures.

When a plurality of blocks of data are written out, each block of data and its associated content-representative information may be written to a data structure in any suitable and desired way. For example, each block of data and its associated content-representative information may be written to a different respective data structure, such that the plurality blocks of data and their associated content-representative information are written to a respective plurality of data structures, with each data structure containing only a single block of data and its associated content-representative information.

However, in one embodiment, the method comprises (and the processor is configured to) writing a plurality of blocks of data (of the array of data to be written out) and their respective plurality of pieces of associated content-representative information to the same data structure in the memory.

Any suitable and desired number of blocks of data of the array of data (and the associated pieces of content-representative information) may be stored in a common data structure. For example, all of the blocks of data of the array of data (and the associated pieces of content-representative information) that are to be written out may be written to the same, single data structure.

In an embodiment, there are plural data structures, each storing some but not all of the blocks making up the (overall) data array. Thus, in an embodiment, e.g. according to demand, the (e.g. output buffer of the) memory contains a plurality of data structures.

In this embodiment, as outlined above, each of the plural data structures may store only a single block of data and its associated piece of content-representative information. However, in an embodiment, one or more (e.g. each) of the plural data structures stores a plurality (but not all) of the blocks making up the (overall) data array.

Therefore, in an embodiment, the method comprises (and the processor is configured to), for each of a plurality of blocks of data in the array of data, each block of data representing a particular region of the array of data: writing the block of data to a data structure in the memory, and writing the information representative of the content of the block of data to the data structure; wherein two or more of the plurality of blocks and their associated pieces of content-representative information are written to a first data structure in the memory, and one or more others of the plurality of blocks and their associated piece(s) of content-representative information are written to a second data structure in the memory.

Thus, in an embodiment, the number of data structures in the memory to which the plurality of blocks and their associated pieces of content-representative information are written is less than the number of blocks of data being written out. In an embodiment, the plural data structures each store plural blocks of data and their associated content-representative information.

The number of data structures required may, for example, depend on the number of blocks to be written out (which, in turn, may depend on the size of the array of data and/or the (e.g. variable) number of blocks to be written out at any given time).

Any suitable and desired number of blocks may be stored in a (e.g. each of the) data structure(s). In an embodiment, each data structure stores the same number of blocks of the data array.

In an embodiment the content-representative information is written to (e.g. a region of) the data structure separately from the corresponding block of data (which, e.g., is written to a different region of the data structure). Thus, for example, the block of data is (e.g. encoded and) written to a region of the data structure (for storing blocks of data) and the corresponding content-representative information is written to a region of the data structure (allocated) for storing header information, e.g. alongside other header information for the data stored in the data structure.

Thus, in an embodiment, the method comprises (and the processor is configured to): when an array of data is to be stored in a memory:

writing the block of data to a region of the data structure in the memory, wherein the data structure comprises one or more regions for storing block(s) of data of the array and a region for storing associated header information; and writing the information representative of the content of the block of data to the region for storing associated header information.

When a plurality of blocks of data of an array of data and their respective plurality of pieces of associated content-representative information are to be written to memory, in an embodiment the method comprises (and the processor is configured to): for each of a plurality of blocks of data in the array of data, each block of data representing a particular region of the array of data:

writing the block of data to a region of a data structure in the memory, wherein the data structure comprises a plurality of regions for storing blocks of data of the array and a region for storing associated header information; and writing the information representative of the content of the block of data to the region for storing associated header information.

Storing the content-representative information in the header (header region) of the data structure (e.g. in an unencoded (e.g. uncompressed) format) allows the content-representative information to be accessed easily (e.g. by a driver), when working with the associated block(s) of data stored in the data structure. This may particularly be the case when a plurality of blocks of data are stored in the data structure (along with their respective pieces of content-representative information in the header region), because only a single region of the data structure (i.e. the header region) needs to be referred to when the content-representative information is required.

The content-representative information may be written to (and stored in) (e.g. a region of) the data structure in an unencoded (e.g. uncompressed) format. Alternatively, the content-representative information may be (e.g. encoded (e.g. compressed)) and written to (and stored in) (e.g. a region of) the data structure in an encoded (e.g. compressed) format.

The content-representative information could be written to (and stored in) (e.g. the same region of) the data structure with the block of data from which the content-representative information was generated. In this case, the content-representative information could be written to the data structure in the same format as the block of data. For example, the content-representative information could be encoded (e.g. compressed) with the block of data for writing to the data structure in an encoded (e.g. compressed) format.

However, as outlined above, in an embodiment the content-representative information is written to (and stored in) the data structure separately from the corresponding block of data. This helps to allow the content-representative information to be written to and stored in the data structure in any suitable and desired format, e.g. different to the block of data.

In an embodiment the content-representative information (and, e.g., any other header information) is written to (and stored in) the data structure in a different format to the format of the block of data from which the content-representative information was generated. For example, when the block of data is encoded (e.g. compressed) and written to the data structure, in an embodiment the content-representative information is written to the data structure in an unencoded (e.g. uncompressed) format. This helps to allow the content-representative information (and, e.g., any other header information) to be to be accessed easily (e.g. by a driver), when working with the associated block(s) of data stored in the data structure.

The regions of the data structure may be arranged to store the block(s) of data and the associated content-representative information in any suitable and desired way.

In an embodiment, the block(s) of data are stored (together) in one part (e.g. at one end of) the data structure, with the content-representative information for the block(s) being stored separately to the block(s) in the data structure, in a separate, e.g. header, part of the data structure (e.g. at the other end of the data structure).

Thus, in one embodiment the (e.g. each of the plurality of) data structure(s) comprises a part for storing the block(s) of data, e.g. comprising a plurality of regions for storing a plurality of blocks of data of the array of data. For example, each of the plurality of regions may be configured (e.g. allocated) to store a respective block of data that is written to the data structure.

In an embodiment the data structure comprises one or more regions for storing one or more blocks of data of the array of data (e.g. respectively) and a region for storing header information for the one or more blocks of data.

Thus, the header (the header region) will store (separately from the regions storing the blocks of data) (plural pieces of) header information for (e.g. relating to) the plurality of blocks.

The header (header region) should, and in an embodiment does, store associated header information for the block(s) of data, e.g. including the content-representative information for the block(s) of data.

In an embodiment, the content-representative information for the block(s) of data is stored separately to any other header information for the blocks of data in the header (header region) of the data structure. Thus, in an embodiment the header region of the data structure comprises a sub-region for storing (other) header information for the block(s) of data and a (separate) sub-region for storing the content-representative information for the block(s) of data. In an embodiment, these sub-regions (of the header region) are particular (e.g. predefined) sub-regions of the header region that are, e.g., set aside for these different types of information.

This allows, e.g., the content-representative information to be read and written separately to the rest of the header data.

Thus, in an embodiment, when a plurality of blocks of data are to be stored in a (e.g. each) data structure, the (e.g. each) data structure comprises a plurality of regions for storing blocks of data of the array and a region for storing associated header information (including, e.g., and in an embodiment, the content-representative information, e.g. separately from the other header data). Thus, for a set of plural blocks of data stored (and, e.g., grouped together) in a data structure, the header storage region may provide a common (and, e.g., separate) storage region that is shared by the set of blocks of data, for storing header information relating to the blocks of data, e.g. either individually or collectively.

The header region of the data structure may be located in any suitable and desired location in the data structure, e.g. within a memory page. In one embodiment the header region is at a particular (e.g. predefined) location within the data structure. For example, the header region may be located in the first or last region (e.g. cache line) of the data structure. As will be appreciated, this may allow a block of data and its associated header information to be referred to using only a single (e.g. physical) memory address, because the location of the header information may be known implicitly from the header region (e.g. always) being at the (same) particular (e.g. predefined) location.

As well as the content-representative information, the header region of a data structure storing a set of one or more data blocks may store any suitable and desired header information that may be appropriate for the set of data blocks, e.g. information relating to or associated with the blocks of the array (either individually or collectively) that are stored in the data structure.

Thus the header region (and the header information) for the set of one or more data blocks may, and in an embodiment does, store and comprise, one or more of, and in an embodiment all of: for each data block of the set of data blocks an indication of whether the data block is stored in the memory in a compressed format or not; for each data block of the set of data blocks, any required compression parameters/state, such as an indication of the compression format that has been used for the data block; and for each data block of the set of data blocks, an indication of the number of memory transactions (bursts) that will be needed to read the (compressed) data from the memory for the data block in question (this may be appropriate where a variable rate compression scheme is being used, so it is desirable to indicate how much data needs to be fetched from the memory for each individual data block).

In an embodiment, the regions for storing the blocks of data of the array of data within a data structure are each the same, particular (e.g. predefined) size. The header region for storing the header information (e.g. comprising the sub-region for storing the content-representative information and the sub-region for storing header information for the block(s) of data) is correspondingly also a particular (e.g. predefined) size, and in an embodiment the same size as the data block regions.

In an embodiment, the region size is based on, and corresponds to, the amount of data that can be handled in respective memory transactions (bursts) in the processing system. Thus, in an embodiment, each region corresponds to an integer number of cache lines, such as four cache lines.

In this case, the sub-region of the header region for storing the content-representative information will comprise some but not all of the header region, but, in an embodiment, is again cache-line aligned, so the content-representative information can be readily fetched.

In one embodiment the data structure comprises a single (e.g. 4 kB) page of memory. Thus, in an embodiment, the data structure comprises a continuous set of memory addresses. Arranging the data structure in this manner, e.g. with the data structure storing data blocks organised (e.g. with respective header information) in a memory page and, for example, the data structure (e.g. memory page) having a single physical base address, may help, for example, to simplify the physical addressing that needs to be used in relation to the data blocks, etc., in memory.

This, in turn, may make it easier for the processor (hardware) to work with such data blocks. In particular, it may make it easier for the (e.g. L2) cache of the processor to work with the data blocks. This is because, in at least some embodiments, the (e.g. L2) cache works on physical addresses, so it is easier for the cache when the header information is stored in the same physical memory page as the associated block of data. In this way, the (e.g. L2) cache may only need to keep track a single physical address for both the header and the associated block of data.

The (e.g. 4 kB) page of memory may be arranged in any suitable and desired way. In one embodiment the data structure (e.g. the page of memory) comprises 16 (e.g. 256 B) regions for storing blocks of data of the array of data and/or header information. In an embodiment the data structure comprises fifteen (e.g. 256 B) regions for storing "payload" blocks of data of the array of data (for (e.g.) graphics) processing operations) and one region (e.g. 256 B) for storing associated header information.

A given array of data may, for example, then be divided into and stored as one or more (e.g. a plurality of) such pages (e.g. of size 4 kB) in the memory, e.g. as a buffer. Other sizes of memory pages and blocks would, of course, be possible.

The information representative of the content of a block of data that is to be written to the data structure in the memory may be produced in any suitable and desired way, and may comprise any suitable and desired content-representative information (that is representative of the data values of the data elements of the blocks).

In one embodiment the content-representative information is based on, and in an embodiment derived from, the content of (the data values of the data elements of) the data block. In an embodiment the content-representative information is in the form of a "signature" for the data block, which is generated from or based on the content of the data block.

Such a data block content "signature" may comprise, e.g., and in an embodiment, any suitable set of derived information that can be considered to be representative of the content of the data block, such as a checksum, a CRC (cyclic redundancy check) or a hash value, etc., derived from (generated for) the data block. Suitable signatures would include standard CRCs, such as CRC-32 or CRC-64, or other forms of signature such as MD5, SHA-1, etc.

Any suitable and desired "signature" generation process, such as a CRC function or a hash function (e.g. appropriate to the type of signature being generated), may be used to generate the signature for a data block. In an embodiment the data in the block of data is processed in a selected, e.g. particular or predetermined, order when generating the data block's signature. This may further help to reduce power consumption. In one embodiment, the data is processed using Hilbert order (the Hilbert curve).

It would, e.g., be possible to generate a single signature for all the data channels of the array together (thus a single signature for an, e.g., RGBA, data block (e.g. pixel block)), or a separate signature (e.g. CRC) could be generated for each data channel, e.g. colour plane. Similarly, colour conversion could be performed and a separate signature generated for the Y, U, V planes if desired.

As will be appreciated by those skilled in the art, the longer the signature that is generated for a data block is (the more accurately the signature represents the data block), the less likely there will be a false "match" between signatures (and thus, e.g., the erroneous non writing of a new data block to the output buffer). Thus, in general, a longer or shorter signature (e.g. CRC) could be used, depending on the accuracy desired (and as a trade-off relative to the memory and processing resources required for the signature generation and processing, for example).

In an embodiment, the signature is weighted towards a particular aspect of the content of the data block as compared to other aspects of the content of the block of data (e.g., and in an embodiment, to a particular aspect or part of the data for the block of data (the data representing the content of the block of data)). This may allow, e.g., a given overall length of signature to provide better overall results by weighting the signature to those parts of the (e.g. data representing the) content of the block of data that will have more effect on the overall output (e.g. as perceived by a viewer of the image).

In such an embodiment, a longer (more accurate) signature is generated for the MSB bits of a data value (e.g. colour) as compared to the LSB bits of the data value (e.g. colour). (In general, the LSB bits of a, e.g., colour are less important than the MSB bits, and so the Applicants have recognised that it may be acceptable to use a relatively inaccurate signature for the LSB bits, as errors in comparing the LSB bits for different blocks of data (e.g. rendered tiles) will, the Applicants believe, have a less detrimental effect on the overall output.)

It would also be possible to use different length signatures for different applications, etc., depending upon the, e.g., application's, e.g., display, requirements. This may help to reduce power consumption. Thus, in an embodiment, the length of the signature that is used can be varied in use. In an embodiment the length of the signature can be changed depending upon the application in use (can be tuned adaptively depending upon the application that is in use).

In an embodiment, the content-representative information that is written out for a block can comprise data (e.g. a data value) from the block of data itself, instead of generating (e.g. additional and/or modified) content-representative information (that is, e.g., different to the (individual) data (values) of the block itself). The content-representative information may comprise such data, for example, when a block of data is a "special case", such as all the elements of the block of data having the same value (e.g. a so called constant (or clear) colour block for a frame of image data).

Thus, in an embodiment, instead of generating the content-representative information for a data block, the content-representative information for a block comprises a single value from the content of the block of data, which single value is, in an embodiment, used for the block of data as a whole.

For example, when the block of data is a constant (e.g. clear) value (e.g. colour) (for all data elements of the block), the constant data value for the entire block may be written out as the content-representative information for the block. An indication (e.g. a flag) may also be written out, e.g. in the header information for the block, to indicate that the content-representative information comprises this "special case", e.g. rather than what would be expected otherwise to be contained in the content-representative information. Writing out this content-representative information (and, e.g., the associated indication), may mean that it is redundant to write out the block of data itself (and, in an embodiment, this is what is done when the content-representative information comprises such data).

Thus, in an embodiment, the method comprises (and the processor is configured to) determining when the block of data is a constant (e.g. clear) data value, e.g. colour, (for all data elements of the block), and, when the block of data is a constant value, not (e.g. encoding and) writing the block of data to the data structure in the memory and, e.g., writing as the content-representative information for the block to the data structure in the memory the constant value (e.g. colour) for the entire block.

In an embodiment the method comprises (and the processor is configured to) writing an indication (e.g. a flag) to the (e.g. header of the) data structure in the memory that the content-representative information for the block comprises a data value (e.g. colour) to be used for the entire block. Thus the header information may comprise, for each block of the set of data blocks, an indication (e.g. flag) of whether the content-representative information comprises a constant data value (e.g. colour) for the entire block, or a content-representative "signature".

Therefore, rather than each block of data simply being written out to a data structure in the memory once it is ready, the block of data may instead first be assessed to determine whether it is a constant value (e.g. colour), and (not) (e.g. encoding and) writing the block of data to the memory on the basis of that assessment. The Applicants have found and recognised that this process can be used to (further) reduce the number of blocks of data that will be written to the memory in use, thereby reducing the number of memory transactions and hence the related power and memory bandwidth consumption.

The content-representative information that is produced for a block may be used in or for any suitable and desired way or purpose.

In one embodiment, before writing a block of data to the data structure in the memory, the method comprises (and the processor is configured to):

comparing the information representative of the content of the block of data that has been produced for the block of data to information representative of the content of a block of data that is already stored in a data structure in the memory, and determining whether or not to write the block of data (and, e.g., the content-representative information) to a data structure in the memory on the basis of the comparison.

In an embodiment the step of comparing the content-representative information that has been produced for a block of data to be written to memory to the content-representative information for a block of data stored in memory is performed to assess the similarity (or otherwise) of the blocks of data. In an embodiment the decision as to whether or not to write the block of data is made based on the similarity (or otherwise) of the respective content-representative information for the blocks of data.

The content-representative information produced for new and previous blocks may thus be used to allow a comparison to be made between the new block of data to be written out and at least one block of data that has been previously written out (and thus which at least one block and its associated content-representative information is already stored in the data structure in the memory). Thus, rather than each block of data simply being written out to a data structure in the memory once it is ready, the block of data may instead first be compared to at least one block of data that is already stored in the memory (by comparing the respective content-representative information for these blocks), and it is then determined whether to write the (new) block of data to the memory (or not) on the basis of that comparison.

The Applicants have found and recognised that this process can be used to reduce, potentially significantly, the number of blocks of data that will be written to the memory in use, thereby significantly reducing the number of memory transactions and hence the related power and memory bandwidth consumption.

For example, and in an embodiment, when it is found that the content-representative information for a newly generated block of data is sufficiently similar to (e.g. the same as) the content-representative information for a block of data that is already stored in the memory, it can be (and in an embodiment is) determined to be unnecessary to write the newly generated block of data to the memory, thereby eliminating the need for that memory "transaction".

On the other hand, when it is other than (it is not) determined from the content-representative information that the block to be written to the data structure in the memory is sufficiently similar to (e.g. the same as) a block that is already stored in the memory, then the new block should be written to the data structure in the memory as discussed above.

Moreover, the Applicants have recognised that it may be a relatively common occurrence for a new block of data to be the same or similar to a block of data that is already in the memory, for example in regions of an image that do not change from frame to frame (such as the sky, the playfield when the camera position is static, much of the user interface for many applications, etc.). Thus, by facilitating the ability to identify such regions and to then, if desired, avoid writing such regions to the memory again, a significant saving in write traffic (write transactions) to the memory can be achieved.

In general, the content-representative information comparisons and the data block writing (or not) can be configured in any suitable and desired manner. In an embodiment it is configured in the manner of the Applicant's earlier U.S. Pat. Nos. 9,881,401, 9,406,155 and 8,988,443 relating to the elimination and reduction of the memory transactions using such techniques.

Thus, in an embodiment the method further comprises (and the processor is configured to), when it is determined to write the block of data to the data structure in the memory on the basis of the comparison: writing the block of data to a data structure in the memory. (In an embodiment the method comprises (and the processor is configured to), when it is determined not to write the block of data to the data structure in the memory on the basis of the comparison: not writing the block of data to a data structure in the memory.)

In an embodiment the method also comprises (and the processor is configured to), when it is determined to write the block of data to the data structure in the memory on the basis of the comparison: writing the information representative of the content of the block of data to the data structure. When it is determined not to write the block of data to the data structure in the memory on the basis of the comparison, in an embodiment the method comprises not writing the information representative of the content of the block of data to the data structure.

Thus, in an embodiment the content-representative information is written to the data structure (and/or, e.g., the header information is updated) whenever the block of data (from which the content-representative information has been produced) is written to the data structure in the memory. However, as discussed herein, in some embodiments, the block of data may not be written to the memory, e.g. as a result of a comparison with a block of data that is already stored in memory. In this case (when the block of data is not written to the data structure in the memory), in an embodiment the content-representative information generated from the block of data is (also) not written to the data structure in the memory (and/or the header information is not be updated).

The content-representative information for a newly generated block of data may be compared with the content-representative information for a block of data that is stored for the corresponding data block position (in an array of data) stored in the memory, and/or with the content-representative information for a block or blocks of data having different positions in the array, as desired.

In an embodiment, the content-representative information for a block that is to be written back to the memory is compared to the content-representative information for the version of the block that is already stored in the memory (i.e. the block in the memory having the same position in the data array as the block to be written back).

This comparison, to see when the content-representative information for the new block of data matches (or at least sufficiently matches) with the content-representative information for the block of data that is already stored in the memory, enables it to be determined when the new block of data that is to be written to the data structure in the memory is sufficiently similar to (e.g. the same as) the existing version of the block that is already stored in the memory or not.

It would also be possible, e.g. when a set of plural blocks of data and their associated content-representative information are stored in the same data structure, to compare the content-representative information for a block of data to be written back to memory to the content-representative information for other blocks of data, as well as the corresponding block of data, that is stored in the (e.g. same data structure in the) memory. For example, the content-representative information for the new block of data to be written back to the memory could be compared to the content-representative information for the other blocks in the set of plural blocks that it shares a header data block with (as well as being compared with the content-representative information for the version of the block itself that is stored in the memory). This would then potentially allow more block "matches" to be identified.

In this case, in an embodiment, the content-representative information for a block of data that is to be written back to the memory is compared to the content-representative information for plural other blocks, e.g. the other blocks in the set of plural blocks that it shares a header data block with (i.e. with the content-representative information that is stored in the header data block for the set of data blocks), to determine when the content-representative information for the new block that is to be written back to the memory is sufficiently similar to the content-representative information for another block that is stored in the memory or not. In this case therefore, the blocks will be tested for similarity, e.g. within the set of blocks that are stored and grouped together as a set of plural data blocks with a common header data block (e.g., and in an embodiment, as a memory page).

In these arrangements, when it is determined from the comparisons of the content-representative information that a block of data is sufficiently similar to a block of data that is already stored in the memory other than the block of data itself, that is, in an embodiment, noted and recorded, e.g. in the header information for the block of data in question (e.g. for the set of plural data blocks that the block of data in question belongs to). For example, and in an embodiment, the header information could record that the block is similar to another block, and indicate the identity of that another block that should be used as the block in question. Other arrangements would be possible, if desired.

As will be appreciated from the above, the technology described herein is, in an embodiment, implemented in a system comprising a memory and a processor (e.g. a graphics processing unit (GPU)). Data for performing (e.g. graphics) processing operations (e.g. to generate a render output (e.g. image to be displayed)) is, in an embodiment, stored in the memory.

The processor is, in an embodiment, arranged to produce content-representative information of block(s) of data of an array of data to be written out to memory, and to write out the block(s) of data and the associated content-representative information to a data structure in the memory, in the manner described above. This output (e.g. forming (at least part of) a render output) that is written to the memory (e.g. via a cache system), is, in an embodiment, displayed, e.g. on a display of an electronic device, such as a phone, tablet, television, computer screen or the like.

The memory may be, and in an embodiment is, external (e.g. off-chip) to the processor. In one embodiment the memory comprises a (e.g. external) DRAM. Other arrangements would, of course, be possible.

The (e.g. graphics) processor (e.g. graphics processing unit) may, and in an embodiment does, implement and execute a (graphics) processing pipeline to perform (graphics) processing operations.

In the case of a graphics processor and graphics processing pipeline, the graphics processing pipeline may include, and in an embodiment does include, any one or more, and in an embodiment all, of the processing stages that a graphics processing pipeline may normally include, such as, and in an embodiment, a primitive setup stage, a rasteriser, a renderer (in an embodiment in the form of or including a programmable fragment shader (a shader core)).

In an embodiment, the graphics processor (processing pipeline) also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

In an embodiment, the (e.g. graphics) processing system includes a host processor that executes applications that may require (e.g. graphics) processing by the (e.g. graphics) processor. In an embodiment the system further includes appropriate storage (e.g. memory), caches, etc., as described above.

The technology described herein may be used in and with any suitable and desired data processing system and processor. The processor may, for example, comprise a graphics processing unit (GPU), a display processing unit (DPU), a video processing unit (VPU) or an image signal processor (ISP).

As one example, the technology described herein may be used with tiled renderers (tile-based graphics processing systems). Thus, in an embodiment, the processor (processing pipeline) is a tiled-based graphics processor (processing pipeline). However, other arrangements would of course be possible.

In an embodiment, the various functions of the technology described herein are carried out on a single processing platform that generates and outputs the data array that is, e.g., written to a frame buffer for a display device.

In an embodiment, the data processing system and/or processor also comprises, and/or is in communication with, one or more memories and/or memory devices that store the data described herein, and/or that store software for performing the processes described herein. The data processing system and/or processor may also be in communication with a host microprocessor, and/or with a display for displaying images based on the data generated by the processor (processing pipeline).

The technology described herein may be implemented in any suitable system, such as a suitably configured microprocessor based system. In some embodiments, the technology described herein is implemented in computer and/or micro-processor based system.

The various functions of the technology described herein may be carried out in any desired and suitable manner. For example, the functions of the technology described herein may be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., when desired.

Furthermore, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that may be programmed to perform the desired operation. Equally, any one or more of the processing stages and processing stage circuits/circuitry of the technology described herein may comprise a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the features described herein.

The methods of the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of a graphics processing system.

Like reference numerals are used for like elements and features in the Figures, where appropriate.

FIG. 1 shows an exemplary graphics processing system 1 in which the technology described herein and the present embodiments may be implemented.

The exemplary graphics processing system 1 shown in FIG. 1 comprises a host processor comprising a central processing unit (CPU) 2, a graphics processor (graphics processing unit (GPU)) 3, a video codec 4, a display controller 5 and a memory controller 6, which are in the form of a system on chip SoC 7. As shown in FIG. 1, these units communicate via an interconnect 8 and have access to an off-chip memory system (memory) 9. In this system, the GPU 3, the video codec 4 and/or CPU 2 will generate frames (images) to be displayed and the display controller 5 will then provide frames to a display 10 for display.

In use of this system, an application 11, such as a game, executing on the host processor (CPU) 2 will, for example, require the display of frames on the display 10. To do this the application 11 will send appropriate commands and data to a driver 12 for the graphics processing unit 3 that is executing on the CPU 2. The driver 12 will then generate appropriate commands and data to cause the graphics processing unit 3 to render appropriate frames for display and store those frames in appropriate frame buffers, e.g. in main memory 9. The display controller 5 will then read those frames into a buffer for the display from where they are then read out and displayed on the display panel of the display 10.

As part of this processing, the graphics processor 3 will read in data, such as textures, geometry to be rendered, etc. from the memory 9, process that data, and then return data to the memory 9 (e.g. in the form of processed textures and/or frames to be displayed), which data will then further, e.g. as discussed above, be read from the memory, e.g. by the display controller 5, for display on the display 10. Thus there will need to be transfer of data to and from the graphics processor 3 (in particular to and from the processing cores of the graphics processor 3) and the memory 9.

In order to facilitate this and to reduce the amount of data that is written out to the memory 9 during graphics processing operations, the graphics processing system 1 also comprises a cache system 13, arranged between the graphics processor 3 and the interconnect 8. The cache system 13 is operable to transfer data between the memory 9 and the graphics processor 3. The cache system 13 thus controls the writing of data (e.g. pixel) blocks generated by the graphics processor 3 to the memory 9.

Figure 2:
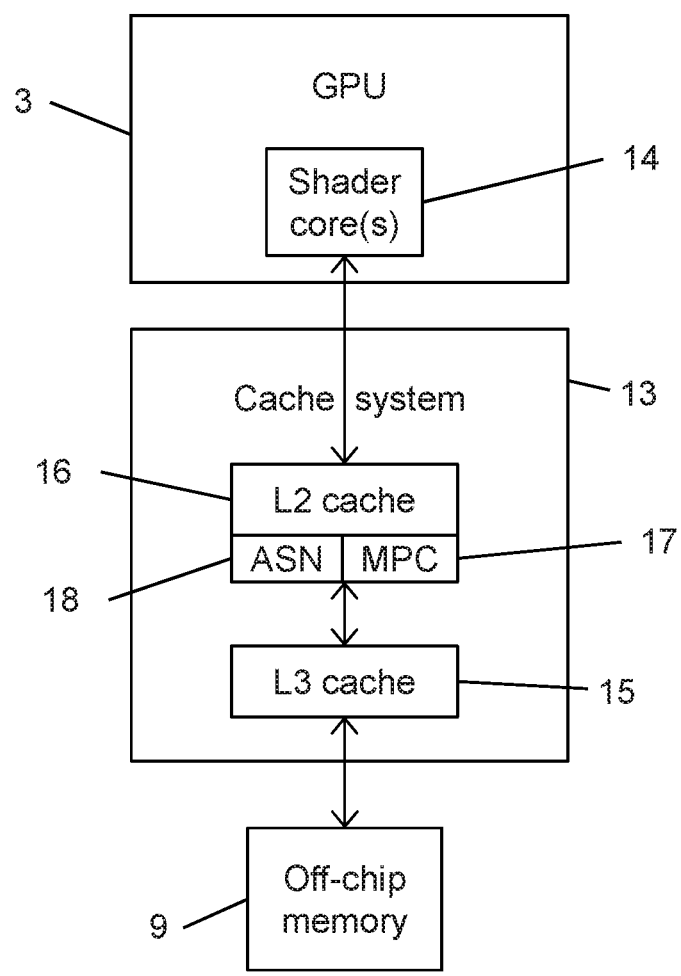
FIG. 2 shows schematically and in more detail the cache system of the graphics processing system shown in FIG. 1.

FIG. 2 shows schematically and in more detail the elements of the graphics processing system 1 (including the cache system 13) that are relevant to the operation of the present embodiments, and in particular to the transferring of data to the memory 9 from the graphics processor 3 using "transaction elimination" operations. As will be appreciated by those skilled in the art, there may be other elements of the system, etc., that are not shown in FIG. 2.

FIG. 2 shows the memory 9 and the graphics processor 3. As shown in FIG. 2, in between the memory 9 and the graphics processor 3, there is a cache system 13 that is operable to transfer data from the memory 9 to the graphics processor 3 (and in particular to the processing cores (shader cores) 14 of the graphics processor 3), and conversely to transfer data produced by the processing cores 14 of the graphics processor 3 back to the memory 9.

The cache system shown in FIG. 2, is illustrated as comprising two cache levels, an L3 cache 15 that is closer to the memory 9, and an L2 cache 16 that is closer to the graphics processor 3 (and from which the data is provided to the shader cores 14). Other cache hierarchy arrangements would be possible, such as comprising only a single cache level (the L2 cache), or more than two cache levels, if desired.

As shown in FIG. 2, in this embodiment data is transferred from the memory 9 to the L3 cache 15, then from the L3 cache 15 to the L2 cache 16, and from the L2 cache 16 to the shader cores 14 (and vice-versa).

In order to facilitate the handling of compressed data from the memory 9 (and for returning compressed data to the memory 9) when that is required, as shown in FIG. 2, the L2 cache 16 has associated with it a data encoder 17 (in the form of a memory page compression unit (MPC)).

This data encoder 17 is operable to decompress data received from the memory 9 via the L3 cache 15 before storing that data in an uncompressed form in the L2 cache 16 for use by the shader cores 14 of the graphics processor 3, and, conversely, to compress data that is to be evicted from the L2 cache 16 prior to writing that data back to the memory 9 (again via the L3 cache 15). The operation of this data encoder (MPC) 17 will be discussed in more detail below.

The L2 cache 16 also includes, as shown in FIG. 2, an appropriate interconnect 18 (in this case in the form of an asynchronous switch network) for transferring data between the L2 cache 16 and the shader cores 14.

Furthermore, as will be explained below, when data is to be written out to the memory 9 from the shader cores 14 of the graphics processor 3, the data encoder 17 of the cache system 13 also performs "transaction elimination" operations to generate, for each relevant data block, information representative of the content of the data block (e.g. a CRC "signature"). The data encoder 17 then compares that signature with the signature for the version of the data block (having the same position in the data array) that is already stored in the memory 9 to see when the signatures match.

If the signatures match, it is then assumed that the new data block is the same as the version of the data block already stored in the memory 9, and so the data encoder 17 abstains from writing the new data block to the memory 9. In this way, write traffic for data blocks that do not actually change from one frame to the next can be avoided. This can save a significant amount of bandwidth and power consumption in relation to the memory write operation.

On the other hand, when the signatures do not match, then the new data block is written to the memory 9, along with the generated signature for the data block.

The present embodiments relate in particular to improved techniques for handling such signatures, e.g. when writing out data from the graphics processor 3 to the memory 9.

In the present embodiments, the data (e.g. data arrays) that are being processed by the graphics processor 3 are stored as respective blocks of data (blocks of the data array) in the memory 9, with each data block being stored in the memory 9 in a compressed form, but being stored in a cache for the graphics processor 3 in an uncompressed form for use by the shader cores of the graphics processor 3.

Figure 3:
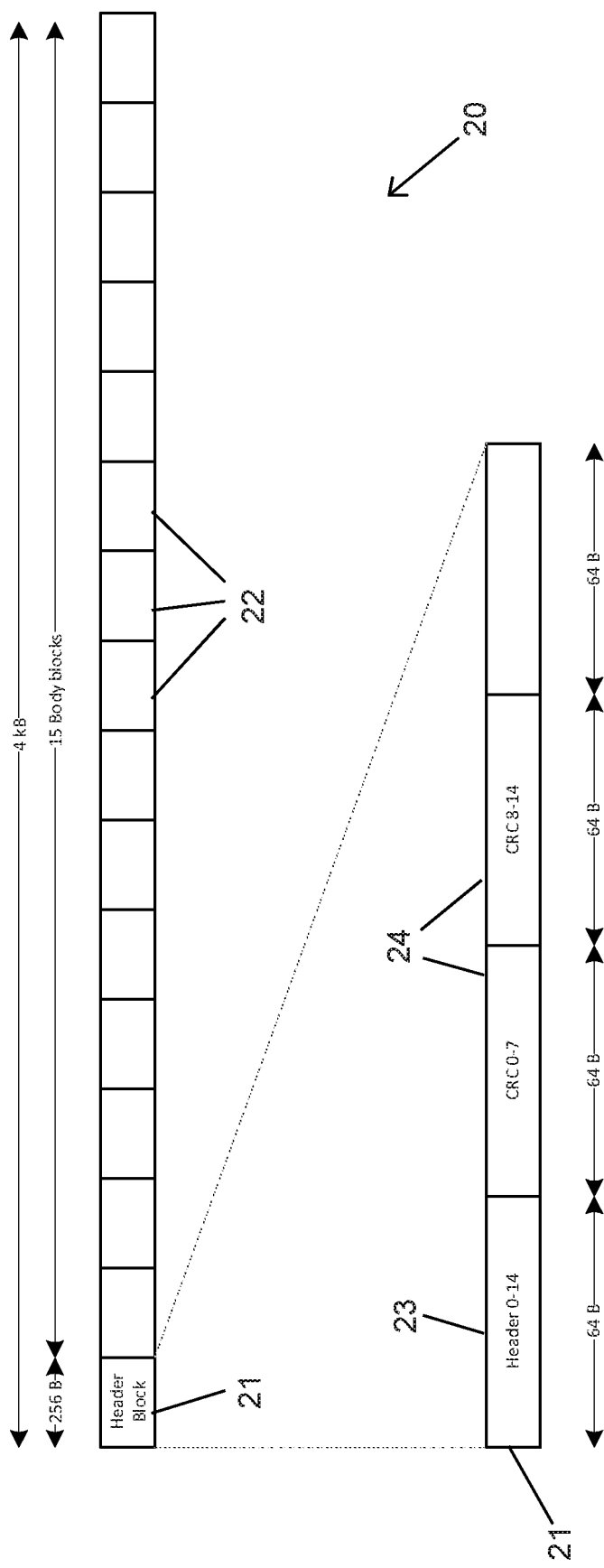
FIG. 3 shows a data structure used in embodiments of the technology described herein.

In the present embodiments, plural data blocks from a data array are stored in a respective data structure, that stores plural blocks of data together with a respective header block for the set of blocks of data in question. FIG. 3 illustrates this, and shows a data structure 20 comprising a set of fifteen storage regions 22 for storing respective blocks of data that will be stored in the data structure 20 together with header region 21 for storing header information associated with the set of data blocks 22.

In the present embodiment, the header region 21 comprises 256 bytes and each data block storage region 22 also comprises 256 bytes (this size of data blocks may, for example, correspond to an integer number of (e.g. four) cache lines).

The data structure 20 having the fifteen data block storage regions 22 together with their header region 21 accordingly comprises a 4 kilobyte memory page (and the data blocks and the header information will be stored in and fit in the same memory page). This then facilitates addressing of the data blocks, as they will all use the same single, physical memory address.

Other configurations that achieve this kind of arrangement could be used if desired, e.g. depending upon the memory page and relative cache line sizes used in the graphics processing system in question.

As shown in FIG. 3, the header block stored in a header region 21 for a set of data blocks (stored in the data block storage regions 22) may include any suitable and desired header data. This may comprise, for example, an indication 23 for each respective data block of: whether that data block is stored in a compressed form (and (some) compression state needed for decoding (decompressing) the block (if desired)), whether the header data includes a constant colour representation of a block, and/or of how many memory transactions (bursts) will be needed to fetch the data for that block from the memory (in its compressed form).

As shown in FIG. 3, in the present embodiments, the header block 21 also includes a respective content-indicating signature 24, in the form of a CRC, for each data block that the header block relates to. The use of these signatures (CRCs) will be discussed further below.

Any other suitable and desired form of header data can also be included in the header block 21, as desired.

Figure 4:
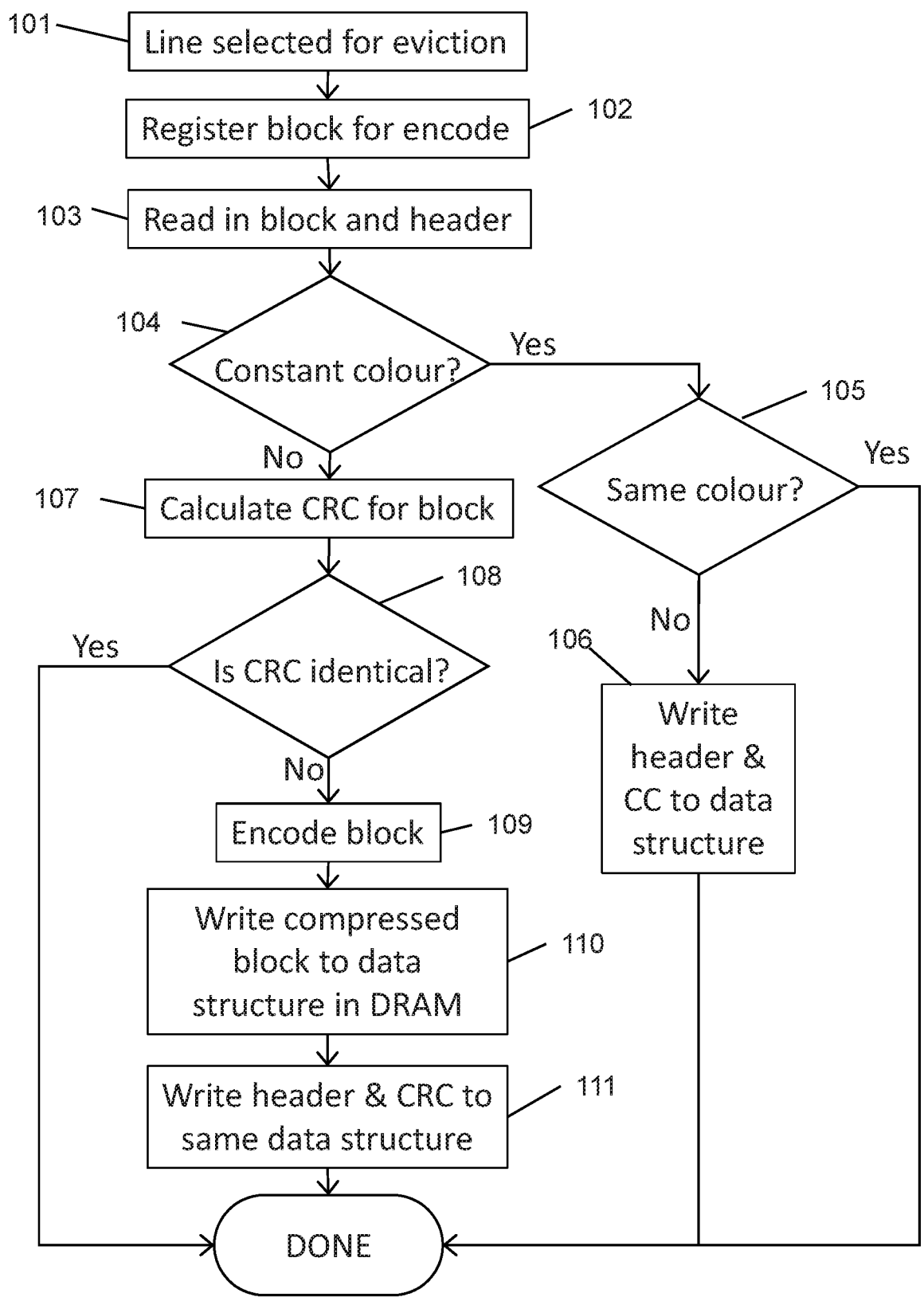
FIG. 4 is a flowchart showing an operation of writing data from the graphics processor to the memory in an embodiment of the technology described herein.

FIG. 4 shows an embodiment of the operation where data is to be written from (e.g. evicted from a cache of) the graphics processor 3 back to the memory 9.

The write process shown in FIG. 4 includes a check on whether a block to be written back to the memory 9 (to be evicted from the L2 cache 16) is the same as the version of that block that is already stored in the memory 9 (with the operation in that case, then not writing the block back to the memory 9, because the version of that block stored in the memory 9 is already the same as the block that is to be written back).

As shown in FIG. 4, the determination of whether the new block is the same as the version of the block that is already stored in memory 9 is based on a comparison of content-representative signatures in the form of CRCs (cyclic redundancy checks) for the blocks.

As shown in FIG. 4, the process will start when, for example, a line of the L2 cache of the graphics processor 3 is selected for eviction (and triggered to be evicted) (step 101). The block of data that includes the data (cache line) that is being evicted is recorded (registered) in the data encoder 17 associated with the L2 cache 16 as requiring encoding (compressing) and returning to the memory 9 (step 102).

The data encoder 17 will then attempt to read all the lines relating to the block of data in question (so including the line selected for eviction but also any cache lines for the block of data that have not been selected for eviction) from the L2 cache 16 (step 103). The lines that are read from the L2 cache 16 are also invalidated (marked as being invalid) (so available for re-use).

The header data for the block of data is also read by the data encoder 17 from the memory 9 (step 103).

Should not all the data for the block in question be present in the L2 cache 16, and the header data indicates that the block is stored in a compressed form in the memory 9, the compressed data for the (entire) block that is stored in the memory 9 is read by the data encoder 17 and decoded (decompressed) to provide the uncompressed form of the block. This allows the remaining part of the block, that was not present in the L2 cache 16, to be made available to the data encoder 17, such that the block can be encoded (compressed) as a whole.

(Alternatively, when the header data indicates that the data for the block in question is stored in an uncompressed form in the memory 9, it may not be necessary for the data encoder 17 to have all of the data for the block. The data that is in the L2 cache 16 for the block may then simply be written out to the appropriate block 22 of the data structure 20 in the memory 9.)

Once the data encoder 17 has read in all of the necessary data for the block in question, along with the header data for the block, the data encoder 17 determines whether the data for the block represents a "constant colour" block (i.e. all of the data elements of the block of data have the same value) (step 104).

When the new block that is to be written back to the memory 9 is determined to be a constant colour block, the data encoder 17 determines from the header data for the version of the block already stored in the memory 9, whether the version of the block already stored in the memory 9 is a constant colour block and, when so, whether the constant colour of the new block (step 105) is the same as the colour of the constant colour block that is already stored in the data structure 20 in the memory 9 (thereby indicating that the content of the two blocks is the same). The constant colour value for the version of the block already stored in the memory 9 may simply be stored in the header data, along with a flag indicating that the block is a constant colour block.

When the colour is determined to be the same, then the data encoder 17 does not write the new block back to the memory 9 (and the data for the block is discarded). This, in effect, leaves the existing version of the block in the memory.

On the other hand, when the colour is determined to be different (or just that the version of the block in the memory is not a constant colour block), then the data encoder 17 does not write the new block back to the memory 9, but instead updates the header data 23 for that block (in the header data block 21 for the set of blocks in question) to indicate that the block in question is a constant colour and writes the constant colour of the block in question as the content-representative signature in the header for the block in question (step 106).

When the new block that is to be written back to the memory 9 is determined to not be a constant colour block, the data encoder 17 reads the content representative signature (CRC) 24 stored in the header block 21 (as shown in FIG. 3) for the block 22 in the memory 9 that the block to be written back corresponds to (for the block in the data structure 20 in the memory 9 having the same position in the data array as the block to be written back), to determine the CRC for that corresponding block in the data structure 20.

The data encoder then calculates a CRC representative of the content of the new block that is to be written back to the memory 9 (step 107), and then compares that newly calculated CRC for the new block to be written back to the memory 9 with the CRC for the version of that block stored in the memory 9 (step 108). The calculation of the CRCs and the comparison of a newly calculated CRC to the previously calculated CRC will be described in more detail with reference to FIGS. 5 and 6.

In the case that the CRC for the new block is the same as the CRC for the version of the block that is already stored in the data structure 20 in the memory 9 (thereby indicating that the content of the two blocks is the same (sufficiently similar)), then the data encoder 17 does not write the new block back to the memory 9 (and the data for the block is discarded). This, in effect, leaves the existing version of the block in the memory.

On the other hand, when the CRC comparisons determine that the new block is different to the version of the block that is already stored in the data structure 20 in the memory 9, then the new block must be written back to the data structure 20 in the memory 9.

The data encoder 22 accordingly then encodes (compresses) the data for the new block appropriately to provide a new compressed version of the block (step 109). The new, compressed version of the block is then written back to the appropriate block 22 of the data structure 20 in the memory 9 (step 110) (to replace the existing version of the block).

The data encoder will correspondingly update the header in the data structure for the set of data blocks in question, e.g. to indicate the new compression metadata, such as the number of memory transactions needed to fetch the compressed data for the block, etc., and write the new CRC (content-representing signature) for the block (determined at step 106) to the header block 21 (step 111).

Figure 5:
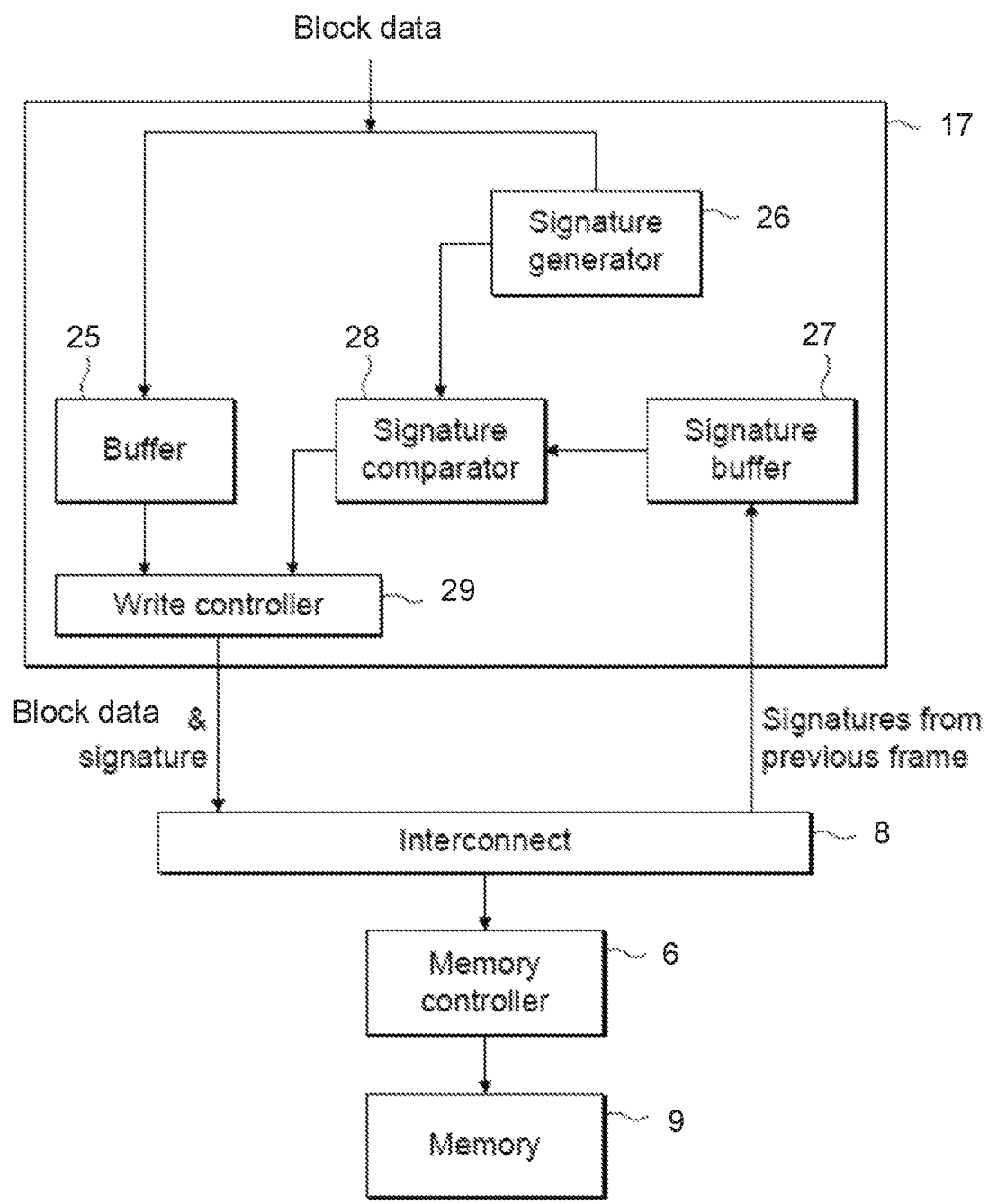
FIG. 5 shows schematically and in more detail the generation and use of content-representative signatures in embodiments of the technology described herein.

FIG. 5 shows in more detail the features of the data encoder 17 of the cache system of the embodiment shown in FIG. 2 that relate to the process of signature generation and comparison (e.g. steps 108 to 111 of FIG. 4).

As shown in FIG. 5, the block of data read by the data encoder 17 from, e.g., the L2 cache 16 of the graphics processor 3, is passed both to a buffer 25 which temporarily stores the block data while the signature generation and comparison process takes place, and a signature generator 26.

The signature generator 26 operates to generate the necessary signature for the block. In the present embodiment the signature is in the form of a 64 bit CRC for the block.

Other signature generation functions and other forms of signature such as hash functions, etc., could also or instead be used, if desired. It would also, for example, be possible to generate a single signature for an RGBA block of data (e.g. tile), or a separate signature for each colour plane. Similarly, colour conversion could be performed and a separate signature generated for each of Y, U and V. In order to reduce power consumption, the tile data processed in by the signature generator 26 could be reordered (e.g. using the Hilbert curve), if desired.

Once the signature for the new tile has been generated, it is passed to a signature comparator 28, which operates to compare the signature of the new block with the signature of the version of the block that is already present in the data structure 20 in the memory 9. (Thus, in the present embodiment, the comparison is with the signature of the block already in the data structure 20 at the block position for the block in question.)

The signatures for plural blocks from the frame as stored in the memory 9 are cached in a signature buffer 27 (this buffer may be implemented in a number of ways, e.g. buffer or cache) of the data encoder 17 to facilitate their retrieval in operation of the system, and so the signature comparator 28 fetches the relevant signature from the signature buffer 27 when it is present there (or triggers a fetch of the signature from the main memory 9), and compares the signature of the version of the block stored in the memory 9 with the signature received from the signature generator 26 to see when there is a match.

If the signatures do not match, then the signature comparator 28 controls a write controller 29 to write the new block and its signature to the data structure 20 in the memory 9 (steps 110 and 111, FIG. 4). On the other hand, when the signature comparator 28 finds that the signature of the new block matches the signature of the block already stored in the data structure 20, then the write controller 29 invalidates the block and no data is written to the data structure 20 (i.e.

the existing block is allowed to remain in the data structure 20 and its signature is retained).

In this way, a block is only written to the data structure 20 in the memory 9 when it is found by the signature comparison to differ from the version of that block that is already stored in the data structure 20. This helps to reduce the number of write transactions to the memory 9 as a frame is being generated.

It would also be possible, in some embodiments (e.g. when a set of plural blocks of data and their associated CRCs are stored in the same data structure in memory), to compare the CRC for a newly generated block of data to be written back to memory with the CRC(s) for another block or other blocks of data having different positions in the frame or with the CRC(s) for a block or blocks of data in other (e.g. previous or subsequent) frames, as well as the corresponding block of data, that is stored in the (e.g. same data structure in the) memory.

When the CRC for the new block is the same as the CRC for a block that is already stored in the memory, then the data encoder does not write the new block back to the memory 9 (and the data for the block is discarded). Instead, the data encoder updates the header data for that block (in the header data block for the set of blocks in question) to indicate that the block in question is identical to the determined, identical other block.

Although the present embodiments have been discussed above with particular reference to cache operations in relation to a graphics processor in a graphics processing system, the Applicants have recognised that the use of a data encoder associated with a cache in the manner of the present embodiments discussed above would be useful in other cache arrangements and systems, and not just in the context of graphics processors.

For example, the processor could comprise a display processor, a video processor or an image signal processor (ISP).

It can be seen from the above that the technology described herein, in some embodiments at least, provides an efficient and effective mechanism for storing (e.g. compressed) blocks of data and associated information representative of their content (e.g. signatures (e.g. CRCs)).

This is achieved in some embodiments of the technology described herein at least, by storing a block of data and its associated content-representative information in the same data structure in memory. This can make it easier for a, e.g., driver to work with this data as whole. This may particularly be the case for newer graphics APIs such as Vulkan.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a data processing system comprising:
   when an array of data is to be stored in a memory:
      producing information representative of the content of a block of data representing a particular region of the array of data;
      writing the block of data to a data structure in the memory; and
      writing the information representative of the content of the block of data to the data structure;
   wherein the data processing system comprises a cache system configured to transfer blocks of data stored in the memory to the processor for use by the processor when performing processing operations and to transfer blocks of data from the processor to the memory;
   the cache system comprising a cache configured to receive blocks of data from the memory and to provide blocks of data to the processor for use when performing processing operations and to receive blocks of data from the processor for sending to the memory, and a data encoder associated with the cache;
   wherein the method comprises:
      when data is to be written from the cache to the memory, the data encoder encoding an uncompressed block of data from the cache for storing in the memory in a compressed format and sending the block of data in the compressed format to the memory for storing; and
      when a block of data in a compressed format is to be read from the memory into the cache, the data encoder decoding the compressed block of data from the memory and storing the block of data in the cache in an uncompressed format.

2. The method as claimed in claim 1, wherein the method comprises, when an array of data is to be stored in a memory:
   encoding the block of data of the array of data;
   writing the encoded block of data to the data structure in memory; and
   writing the information representative of the content of the block of data to the data structure in an unencoded format.

3. The method as claimed in claim 1, wherein the method comprises, for each of a plurality of blocks of data in the array of data, each block of data representing a particular region of the array of data:
   producing information representative of the content of the block of data;
   writing the block of data to a data structure in the memory; and
   writing the information representative of the content of the block of data to the data structure, such that the data structure stores the plurality of blocks of data and the plural pieces of information representative of the content of the plurality of blocks of data.

4. The method as claimed in claim 3, wherein the method comprises:
   writing two or more of the plurality of blocks and their associated pieces of content-representative information to a first data structure in the memory; and
   writing one or more others of the plurality of blocks and their associated piece(s) of content-representative information to a second data structure in the memory.

5. The method as claimed in claim 3, wherein the method comprises, for each of a plurality of blocks of data in the array of data, each block of data representing a particular region of the array of data:
   writing the block of data to a region of a data structure in the memory, wherein the data structure comprises a plurality of regions for storing blocks of data of the array and a region for storing associated header information; and writing the information representative of the content of the block of data to the region for storing associated header information.

6. The method as claimed in claim 1, wherein the method comprises determining when the block of data is a constant data value; and
when the block of data is a constant value:
not writing the block of data to the data structure in the memory; and
writing the constant value for the entire block to the data structure in the memory as the information representative of the content of the block of data.

7. The method as claimed in claim 1, wherein the method comprises:
comparing the information representative of the content of the block of data that has been produced for the block of data to information representative of the content of a block of data that is already stored in a data structure in the memory for at least one block of data already stored in the data structure in the memory; and
determining whether or not to write the block of data to the data structure in the memory on the basis of the comparison.

8. The method as claimed in claim 1, wherein the data structure comprises one or more regions for storing one or more blocks of data of the array of data and a region for storing header information for the one or more blocks of data.

9. The method as claimed in claim 8, wherein the header region of the data structure comprises a sub-region for storing header information for the one or more blocks of data and a sub-region for storing the content-representative information for the one or more blocks of data.

10. A data processing system comprising:
a memory; and
a processor in communication with the memory;
wherein the processor is configured to:
when storing an array of data in the memory:
produce information representative of the content of a block of data representing a particular region of the array of data;
write the block of data to a data structure in the memory; and
write the information representative of the content of the block of data to the data structure;
wherein the data processing system comprises a cache system configured to transfer blocks of data stored in the memory to the processor for use by the processor when performing processing operations and to transfer blocks of data from the processor to the memory;
the cache system comprising:
a cache configured to receive blocks of data from the memory and to provide blocks of data to the processor for use when performing processing operations and to receive blocks of data from the processor for sending to the memory; and
a data encoder associated with the cache and configured to:
when a data block in an uncompressed format is to be written from the cache to the memory, encode the uncompressed data block from the cache for storing in the memory in a compressed format and send the data block in the compressed format to the memory for storing; and
when a data block in a compressed format is to be read from the memory into the cache, decode the compressed data block from the memory and store the data block in the cache in an uncompressed format.

11. The data processing system as claimed in claim 10, wherein the processor is configured to, when an array of data is to be stored in a memory:
encode the block of data of the array of data;
write the encoded block of data to the data structure in memory; and
write the information representative of the content of the block of data to the data structure in an unencoded format.

12. The data processing system as claimed in claim 10, wherein the processor is configured to, for each of a plurality of blocks of data in the array of data, each block of data representing a particular region of the array of data:
produce information representative of the content of the block of data;
write the block of data to a data structure in the memory; and
write the information representative of the content of the block of data to the data structure, such that the data structure stores the plurality of blocks of data and the plural pieces of information representative of the content of the plurality of blocks of data.

13. The data processing system as claimed in claim 12, wherein the processor is configured to:
write two or more of the plurality of blocks and their associated pieces of content-representative information to a first data structure in the memory; and
write one or more others of the plurality of blocks and their associated piece(s) of content-representative information to a second data structure in the memory.

14. The data processing system as claimed in claim 12, wherein the processor is configured to, for each of a plurality of blocks of data in the array of data, each block of data representing a particular region of the array of data:
write the block of data to a region of a data structure in the memory, wherein the data structure comprises a plurality of regions for storing blocks of data of the array and a region for storing associated header information; and
write the information representative of the content of the block of data to the region for storing associated header information.

15. The data processing system as claimed in claim 10, wherein the processor is configured to:
determine when the block of data is a constant data value; and
when the block of data is a constant value:
not write the block of data to the data structure in the memory; and
write the constant value for the entire block to the data structure in the memory as the information representative of the content of the block of data.

16. The data processing system as claimed in claim 10, wherein the processor is configured to:
compare the information representative of the content of the block of data that has been produced for the block of data to information representative of the content of a block of data that is already stored in a data structure in the memory for at least one block of data already stored in the data structure in the memory; and
determine whether or not to write the block of data to the data structure in the memory on the basis of the comparison.

17. The data processing system as claimed in claim 10, wherein the data structure comprises one or more regions for storing one or more blocks of data of the array of data and a region for storing header information for the one or more blocks of data.

18. The data processing system as claimed in claim 17, wherein the header region of the data structure comprises a sub-region for storing header information for the one or more blocks of data and a sub-region for storing the content-representative information for the one or more blocks of data.

19. A non-transitory computer readable storage medium storing computer software code which when executing on a data processor performs a method of operating a data processing system comprising:

when an array of data is to be stored in a memory:
producing information representative of the content of a block of data representing a particular region of the array of data;
writing the block of data to a data structure in the memory; and
writing the information representative of the content of the block of data to the data structure wherein the data processing system comprises a cache system configured to transfer blocks of data stored in the memory to the processor for use by the processor when performing processing operations and to transfer blocks of data from the processor to the memory;

the cache system comprising a cache configured to receive blocks of data from the memory and to provide blocks of data to the processor for use when performing processing operations and to receive blocks of data from the processor for sending to the memory, and a data encoder associated with the cache;

wherein the method comprises:
when data is to be written from the cache to the memory, the data encoder encoding an uncompressed block of data from the cache for storing in the memory in a compressed format and sending the block of data in the compressed format to the memory for storing; and
when a block of data in a compressed format is to be read from the memory into the cache, the data encoder decoding the compressed block of data from the memory and storing the block of data in the cache in an uncompressed format.

\* \* \* \* \*